United States Patent [19]
Ashmead et al.

[11] 3,873,296
[45] Mar. 25, 1975

[54] INCREASING METALS IN BIOLOGICAL TISSUE

[75] Inventors: Harvey H. Ashmead, Kaysville; Paul A. Little, Ogden, both of Utah

[73] Assignee: Harvey H. Ashmead, Kaysville, Utah ; by said Paul A. Little

[22] Filed: Jan. 5, 1970

[21] Appl. No.: 799

Related U.S. Application Data

[63] Continuation-in-part of Ser. No. 739,141, June 24, 1968.

[52] U.S. Cl. ................... 71/77, 71/97, 71/DIG. 2, 71/645 C, 424/9, 424/71, 424/177
[51] Int. Cl. ............................................. A01n 21/02
[58] Field of Search ............... 71/77, 79, 88, 65, 97

[56] References Cited
UNITED STATES PATENTS

| | | | |
|---|---|---|---|
| 3,234,001 | 2/1966 | Gaiser | 71/DIG. 1 |
| 3,537,838 | 11/1970 | Oeriv | 71/77 |
| 3,689,544 | 9/1972 | Scanlon | 71/97 |
| 3,712,802 | 1/1973 | Grybek et al. | 71/79 |
| 3,712,803 | 1/1973 | Grybek et al. | 71/79 |
| 3,742,002 | 6/1973 | Ohlson et al. | 71/97 |

FOREIGN PATENTS OR APPLICATIONS

| | | | |
|---|---|---|---|
| 955,685 | 4/1964 | United Kingdom | 71/88 |
| 1,525,297 | 4/1968 | France | 71/79 |
| 625,507 | 8/1961 | Canada | 71/77 |

*Primary Examiner*—James O. Thomas, Jr.
*Attorney, Agent, or Firm*—H. Ross Workman; J. Winslow Young

[57] ABSTRACT

Methods of increasing the concentration of essential metals in biological tissue by making an exogenically synthesized metal proteinate (chelate) available for assimilation into the tissue. Analysis of selected portions of the tissue for deficiency of such metals may first be conducted.

4 Claims, No Drawings

INCREASING METALS IN BIOLOGICAL TISSUE

The present invention relates to biological use of metal preparations and more particularly to methods of increasing the availability of chelated metal to living cells. This is a continuation-in-part of copending U.S. Pat. application No. 739,141, filed June 24, 1968.

The term "metal proteinate" as used in this specification means the product resulting from the chelation of a soluble salt with amino acids and/or partially hydrolyzed protein. The metal in the complex is usually in the form of a bivalent ion and, when in the chelated form, is normally inactivated so that it is not involved in chemical reaction. The method of utilizing metal proteinates to increase the amount of metals in biological tissue as herein set forth is believed highly novel although metal proteinates are known substances. Metal proteinates are commercially available, for example, from Albert Richards, Jr., Salt Lake City, Utah.

Although the metal chelated by the proteinate is inactivated, it can be displaced by other metal ions which are capable of forming a more stable chelate. The utility of metal proteinates depends largely upon this displacement phenomenon.

In a biological organism, for example, the body of an animal, all metals exist as metal proteinates. The metal proteinates synthesized by the body can be assimilated without causing undesirable chemical reactions and, once assimilated, donate the essential metals, as needed, for metabolic purposes. Metal proteinates bring about metabolic stimulation by providing all of the essential metals in the most effective proportions for metabolic activity.

Frequently, however, the animal body is not capable of effectively synthesizing sufficient amounts of some or all essential metal proteinates by natural processes to meet metabolic requirements. The result is that the animal suffers a metal deficiency regardless of the amount of inorganic metal ingested and, as a result, the symptoms of disease and deterioration frequently appear. Under these circumstances the animal will in any event have a lack of physical well-being that could be prevented by more abundant availability of metal proteinates to the cells.

This is likewise true of plant tissue. Plants which have a deficiency in chelated metal have been shown to be smaller and less productive.

It is therefore a primary object of the present invention to overcome or alleviate the problems of the mentioned type.

The present invention comprises unique methods for making metal proteinate abundantly available to biological tissue regardless of the endogenic synthesizing capabilities of the animal or plant. We have discovered that the availability of metal proteinate to the tissue cells is significantly increased by causing the animal or plant to ingest a suitable amount of exogenically prepared metal proteinate. (The type and amount of metal proteinate to be given may be determined by analysis of tissue from various selected locations of the plant or animal.) The metal proteinate is ingested and, without endogenic synthesis, metal proteinate is made freely available to the tissue of the recipient without injury to the animal or plant in an amount which, if given in inorganic form, would normally have a toxic effect.

Ingestion, sometimes called feeding, as used in this specification means taking of a substance into an organism by any suitable way, for example, by mouth, infusion, injection, absorption, osmosis, etc.

It is therefore another primary object of the present invention to provide a method of increasing the availability of metals to biological tissue.

It is another important object of the present invention to provide an effective way of diagnosing deficiency of metal in biological tissue and predicting a desirable dosage of metal proteinate to be provided as a food supplement.

Still another significant object of the present invention is to increase the metal content in biological tissue by providing exogenically prepared metals in a biologically acceptable form.

Another object of the present invention is to provide a method for harmless administration to plants and animals of substantial quantities of metals in the form of proteinate.

These and other objects and features of the present invention will become more fully apparent from the following description and appended claims.

The presently known essential metals in animal nutrition are calcium, magnesium, zinc, iron, manganese, copper and cobalt. There is also evidence that other elements, such as selenium may have significant, if not essential, influence on biological activity. The present invention contemplates the use of mentioned metals, including selenium and other biologically important minerals capable of forming proteinates. A primary function of the essential metals in the animal body is to lend electromotive properties to organic molecules. Electromotive properties of the essential metals come from their ability to capture and release electrons in interactions with acids and proteins. The ability of bivalent metals to capture and release electrons is the basis of construction of the ordinary lead-acid battery. When the battery is charged, bivalent metals store electrons by forming a precipitate. Conversely, when an electrical current is produced, the metals release electrons by going into solution. Individual cells within an animal body work in a manner much like a lead-acid battery. The principal difference is that protein, metals and a controlled pH cooperate to develop an electric potential within the cell. A protein-metal complex provides the equivalent of a battery electrode. The cells within the animal body can be charged, store a charge, and release it when needed for use.

Individual cells at rest have electromotive potentials of as much as 60 to 70 millivolts. When the tissue in which the cells are located is excited, the electromotive potential may range as high as 100 millivolts. The different levels of electromotive potential within the cell appear to be determined by the various kinds and amounts of metals complexed with protein.

Most animal cells receive, store and use electricity for chemical metabolic purposes by assimilating vitamins, minerals, amino acids, and the like as needed to meet daily functions. Also, every organic substance is characterized by some sort of electromotive property which determines its assimilability and the uses made of the substance. Thus, nutrients ingested by the animal are selectively assimilated into the cell according to relative electromotive potential.

The contribution of metal proteinates to cell electromotive potential depends largely upon the normally relatively low solubilities, a property which advantageously controls and prevents the toxic effect of assimilating metals at too fast a rate. The solubilities of the metal proteinates do, however, increase with increasing acidity and, conversely, decrease with increasing alkalinity. Thus, the releasing and storing of electrons is triggered by changing pH conditions within the cell. For example, at a pH of about 8, the cell potential is a function of the amount of metal proteinate in the cell in an insoluble form. Carbonic acid resulting from the reaction of carbon dioxide and water may be formed in the cell. Carbonic acid increases the solubility of the metal proteinate. Putting the metal proteinate in solution causes electrons to be released which charge the cell and develop an electromotive potential. Table I illustrates the solubilities of metal proteinates in buffered solutions having various pH values.

TABLE I

EFFECT OF pH ON SOLUBILITIES OF METAL PROTEINATES IN POTASSIUM PHOSPHATE BUFFERS

| Metal Proteinate | Solubility in pH 8 Buffer | | Solubility in pH 4.5 Buffer | | Solubility in pH 4.5 Buffer with HCl added to about ph 1.5 | |
| --- | --- | --- | --- | --- | --- | --- |
| | pH | metal in mg% | pH | metal in mg% | pH | metal in mg% |
| Magnesium | 9.1 | 0.6 | 6.6 | 74 | 1.5 | 800 |
| Calcium | 8.3 | 1.9 | 6.2 | 27 | 1.8 | 270 |
| Zinc | 8.1 | 0.12 | 5.5 | 5.6 | 1.5 | 272 |
| Iron | 7.7 | 0.04 | 4.7 | 21 | 1.3 | 27 |
| Manganese | 7.6 | 0.62 | 5.0 | 70 | 1.4 | 76 |
| Copper | 7.9 | 2.8 | 5.4 | 2.4 | 1.5 | 100 |
| Cobalt | 7.7 | 7.6 | 5.2 | 38.4 | 1.5 | 41 |

The lack of sufficient quantities of various metal proteinates in the cells to store and release electrical charges results in a condition known as chemical or biological stress. Chemical stress is defined as that condition resulting when chemical reactions within the cell which are normally influenced by metal proteinates are unable to proceed at the rate required by or in the direction intended by the whole organism. Chemical stress hinders growth because of hindrance of the ability of tissue cells to assimilate required nutrients and to otherwise perform their function properly.

The requirements of an animal for metals needed to establish the desired electromotive potential are often met by injecting the inorganic forms of these metals into the animal. The inorganic forms of the nutritionally essential metals have different electromotive properties and potentials than the same metals in the form of proteinates. Some of the metals injected as inorganic compounds may be endogenically chelated with amino acids in the gastro-intestinal tract and when chelated, the metals acquire the desired electromotive property and potential for assimilation by the animal cells.

Metal proteinates are superior to inorganic metal compounds in alleviating chemical stress because many animals or plants will have an inherent defect which inhibits natural endogenic synthesis of metal complex. When one or more metal proteinates are provided, the essential bivalent metals are introduced into the system in a readily assimilable form and thus are immediately available to prevent or correct chemical stress and bring about metabolic stimulation.

The following examples illustrate the invention:

EXAMPLE 1

By way of background, iron deficiency anemia in baby pigs has historically been a problem when sows and their offspring are housed in confinement without access to pasture or soil. The principal factors responsible for this anemia are the extremely high rate of growth, low body stores of iron at birth, and very little iron in sow's milk. Pigs normally reach four to five times their at-birth body weight at the end of three weeks. A growth rate of this magnitude requires the retention of about 7 mgs. of iron per day. Since the sow's milk supplies only about 1 mg. per day, and since the piglets consume little feed other than milk for the first 3 or 4 weeks, the need for endogenous iron is apparent.

The feeding of inorganic iron to the sow before or after farrowing has been ineffective and has neither raised the iron content of the milk significantly nor increased the iron stores of the piglet at birth. Therefore, control of this problem necessitates treating the piglet. This is routinely accomplished in one of two ways: (a) through oral administration of 400 to 500 mgs. inorganic iron tablets or solutions within 4 days after birth and again in 2 weeks after birth, or (b) injection of 100 to 200 mgs. of an iron-complex solution twice during the early growing period. However, the routine handling of a large number of baby pigs in either of the ways indicated is time-consuming and even frequent treatment of the indicated type is insufficient to allow the piglets to achieve maximum growth.

A formulation of metal proteinate was prepared which had the following metal assay:

TABLE II

ASSAY OF METAL PROTEINATE FOR SWINE

| Metal | Percent Composition |
| --- | --- |
| Mg | 6.80% |
| Fe | 1.86 |
| Zn | 1.26 |
| Cu | 0.05 |
| Co | 0.0024 |

The above formulation was fed to sows at the rate of 5 pounds per ton of feed. Assays of the feed before and after the metal proteinates were added showed that the amounts of non-chelated metals as such in the feed did not significantly increase due to the addition of the proteinates. Thus, any stimulative effect would be due to causes other than increased concentration of metals per se. A random sample of the feed was analyzed for metal content which showed 14 mg. iron/100 gms., 2.97 mg. copper/100 gms., 36.8 mg. of zinc/100 gms. and no cobalt.

Eight sows were selected which were half or full sisters bred to the same boar. Four of the sows received feed rations amended with the above metal proteinate formulation beginning approximately thirty days prior to anticipated farrowing dates and continuing until the piglets were weaned at about 60 days of age. The remaining four sows received essentially identical ration without the metal proteinates.

Blood hemoglobin levels were determined on all of the sows initially and again when the sows farrowed 27 to 37 days later. Piglet weights and blood hemoglobin levels were determined at birth and upon weaning. The results of the hemoglobin determinations and piglet weights are set forth in Tables III and IV below:

TABLE III

HEMOGLOBIN (Hb) LEVELS (gm/100 ml)

| Group | Control | | Treated | |
|---|---|---|---|---|
| | Hb Range | Average | Hb Range | Average |
| Sows (4) | | | | |
| Initially | 12–15 | 13.5 | 12–14 | 13.5 |
| At farrowing | 12–14 | 13.3 | 13–15 | 14.3 |
| Litters (4) | | | | |
| At birth | 7.5–9.8 | 9.0 | 9.6–12.0 | 11.0 |
| At weaning | 10.7–12.0 | 11.7* | 11.9–12.8 | 12.2 |

*Some piglets required iron injections

TABLE IV

LITTER WEIGHTS (average in pounds)

| | Control* (3 litters) | Treated (4 litters) |
|---|---|---|
| Birth | 3.60 lbs. (25 piglets) | 3.53 lbs.(31 piglets) |
| Weaning | 37.25 lbs. (21 piglets) | 39.25 lbs.(24 piglets) |
| Gain | 33.00 lbs. | 35.65 lbs. |

*one sow lost, hand-raised pigs excluded

As shown in Table III, the initial hemoglobin levels for the eight sows were normal (average 13.5 gm. percent). At farrowing, treated sows average 14.5 gm. percent compared to 13.3 gm. percent for the control group.

At birth, hemoglobin levels for litters from treated sows averaged 11.0 gm. percent compared to 9.0 gm. percent for the controls. The levels for both groups increased to about 12.0 gm. percent at weaning, but the control piglets had shown signs of anemia and were given injectable iron. As shown in Table IV, pigs from treated sows averaged 3.53 pounds at birth and 39.25 pounds at weaning compared to 3.60 and 37.25 pounds, respectively, for controls. Thus, by feeding sows the metal proteinate formulation, the treated groups of pigs produced an average of 2.65 pounds more per pig than the control group.

EXAMPLE 2

Day-old chicks were divided into groups and to each group was added a standard ratio of feed plus a different single metal proteinate. The chicks were sacrificed at 10 days and the level of calcium in the tissues was determined by atomic absorption spectroscopy. A similar group of day-old chicks was fed the same ration without the addition of the metal proteinate to serve as a control.

Table V illustrates the relative effect of the indicated metal proteinate on the amount of calcium metal in various parts of chick tissue. The values in Table V are reported as a T/C ratio (concentration of metal in Treated chicks/concentration of metal in Control chicks). Thus, a T/C ratio of less than one indicates that the amount of calcium in chick tissue from treated chicks decreased over the amount of calcium in the same tissue type in control chicks while a value of greater than one indicates the reverse.

TABLE V

CHANGES IN AMOUNT OF CALCIUM IN CHICK TISSUES DUE TO SINGLE METAL PROTEINATES IN RATION REPORTED AS T/C (TREATED/CONTROL) RATIO

| Metal proteinate in ration | Brain | Heart | Liver | Breast | Skin | Whole Wing | Feathers | Whole Leg | Feet |
|---|---|---|---|---|---|---|---|---|---|
| 2% Mg | 0.53 | 1.04 | 1.00 | 1.21 | 1.30 | 0.96 | 1.35 | 0.95 | 1.00 |
| 2% Ca | 0.48 | 1.00 | 0.91 | 1.09 | 1.62 | 1.08 | 1.77 | 8.69 | 0.93 |
| 2% Zn | 0.58 | 1.42 | 1.08 | 0.93 | 1.45 | 0.72 | 1.28 | 1.04 | 0.78 |
| 0.5% Mn | 0.56 | 1.00 | 0.95 | 1.15 | 0.97 | 1.20 | 0.86 | 0.86 | 0.78 |
| 0.5% Co | 0.58 | 1.19 | 1.06 | 2.50 | 1.05 | 0.80 | 0.93 | 1.21 | 0.97 |

In general, the data indicate that metal proteinate causes assimilation of calcium by some tissues and, in some cases, movement of calcium to various other tissue locations. Tables VI and VIII to XII indicate the concentration change of other metals in various chick tissue over the same 10-day period responsive to the indicated compositions of metal proteinate. Table VII shows determinations of zinc after 21 days treatment. Tables VI and VIII include zinc methionate. For purposes of this application, zinc methionate is a metal proteinate inasmuch as it is a derivative of methionine.

TABLE VI

EFFECT OF METAL PROTEINATE IN FEED RATION FOR 10-DAY PERIOD ON CONCENTRATION OF METAL IN CHICK FEET

| Metal Proteinate | TREATED BIRDS Test No. | Metal mg/100g | CONTROL BIRDS Test No. | Metal mg/100g | T/C Ratio |
|---|---|---|---|---|---|
| 2% Zn | 1510 | 8.2 | 1511 | 3.4 | 2.41 |
| 2% zinc (methionate) | 1508 | 32.0 | 1511 | 3.4 | 9.41 |
| 0.5% Zn | 1512 | 3.8 | 1511 | 3.4 | 1.11 |
| 2% Mg | 1514 | 74 | 1511 | 60 | 1.23 |
| 2% Ca | 1515 | 4000 | 1511 | 4100 | 0.93 |
| 0.5% Mn | 1509 | 0.5 | 1511 | 0.1 | 5.0 |
| 0.5% Co | 1513 | 0.3 | 1511 | 0 | Raised to detectable level |

TABLE VII

EFFECT OF 2% ZINC PROTEINATE IN FEED RATION FOR 21 DAYS ON LEVEL OF ZINC IN VARIOUS CHICK TISSUES

| | TREATED BIRDS Test No. | Zinc mg/100g | CONTROL BIRDS Test No. | Zinc mg/100g | T/C Ratio |
|---|---|---|---|---|---|
| Brain | 1493 | 1.14 | 1500 | 0.78 | 1.46 |
| Heart | 1498 | 1.32 | 1506 | 1.34 | 0.98 |
| Liver | 1497 | 16.6 | 1505 | 1.8 | 9.22 |
| Lungs | 1499 | 0.92 | 1507 | 0.94 | 0.97 |
| Whole Leg | 1494 | 42.0 | 1502 | 3.6 | 11.66 |
| Leg Tissue | 1495 | 1.44 | 1503 | 1.36 | 1.05 |
| Breast Tissue | 1496 | 0.78 | 1504 | 0.64 | 1.21 |
| Feet | 1492 | 16.0 | 1501 | 4.0 | 4.00 |

TABLE VIII

EFFECT OF 2% ZINC METHIONATE IN FEED RATION FOR 10 DAYS ON LEVELS OF ZINC IN VARIOUS CHICK TISSUES

| | TREATED BIRDS Test No. | Zinc mg/100g | CONTROL BIRDS Test No. | Zinc mg/100g | T/C Ratio |
|---|---|---|---|---|---|
| Brain | 1593 | 0.86 | 1569 | 0.60 | 1.43 |
| Heart | 1597 | 1.50 | 1573 | 1.10 | 1.36 |
| Liver | 1598 | 50.0 | 1574 | 1.94 | 25.77 |
| Breast Tissue | 1595 | 1.26 | 1571 | 0.58 | 2.17 |
| Skin | 1596 | 46.0 | 1572 | 1.98 | 2.32 |
| Whole Leg | 1594 | 16.40 | 1570 | 3.0 | 5.46 |

TABLE IX

EFFECT OF 2% MAGNESIUM PROTEINATE IN FEED RATION FOR 10 DAYS ON LEVELS OF MAGNESIUM IN VARIOUS CHICK TISSUES

| | TREATED BIRDS Test No. | Mg mg/100g | CONTROL BIRDS Test No. | Mg mg/100g | T/C Ratio |
|---|---|---|---|---|---|
| Brain | 1587 | 19 | 1569 | 14 | 1.35 |
| Heart | 1591 | 25 | 1573 | 27 | 0.92 |
| Liver | 1592 | 34 | 1574 | 24 | 1.41 |
| Breast Tissue | 1589 | 29 | 1571 | 24 | 1.20 |
| Skin | 1590 | 32 | 1572 | 20 | 1.60 |
| Whole Leg | 1588 | 58 | 1570 | 44 | 1.31 |

TABLE X

EFFECT OF 2% CALCIUM PROTEINATE IN RATION FOR 10 DAYS ON LEVELS OF CALCIUM IN VARIOUS CHICK TISSUES

| | TREATED BIRDS Test No. | Ca mg/100g | CONTROL BIRDS Test No. | Ca mg/100g | T/C Ratio |
|---|---|---|---|---|---|
| Brain | 1575 | 20 | 1569 | 41 | 0.48 |
| Heart | 1578 | 21 | 1573 | 21 | 1.00 |
| Liver | 1579 | 23 | 1574 | 23 | 1.00 |
| Breast Tissue | 1577 | 35 | 1571 | 32 | 1.09 |
| Skin | 1580 | 57 | 1572 | 35 | 1.62 |
| Whole Leg | 1576 | 20,000 | 1570 | 2,300 | 8.69 |

TABLE XI

EFFECT OF 0.5% MANGANESE PROTEINATE IN RATION FOR 10 DAYS ON LEVEL OF MANGANESE IN VARIOUS CHICK TISSUES

| | TREATED BIRDS Test No. | Mn mg/100g | CONTROL BIRDS Test No. | Mn mg/100g | T/C Ratio |
|---|---|---|---|---|---|
| Brain | 1581 | 0 | 1569 | 0 | None |
| Heart | 1585 | 0.1 | 1573 | 0 | Raised to detectable level |
| Liver | 1586 | 0.1 | 1574 | 0.2 | 0.5 |
| Breast Tissue | 1583 | 0 | 1571 | 0 | None |
| Skin | 1584 | 0 | 1572 | 0.2 | Lowered |
| Whole Leg | 1582 | 0.1 | 1570 | 0.1 | 1.0 |

TABLE XII

EFFECT OF 0.5% COBALT PROTEINATE IN RATION FOR 10 DAYS ON LEVEL OF COBALT IN VARIOUS CHICK TISSUES

|  | TREATED BIRDS | | CONTROL BIRDS | | |
|---|---|---|---|---|---|
|  | Test No. | Co mg/100g | Test No. | Co mg/100g | T/C Ratio |
| Brain | 1563 | 0 | 1569 | 0 |  |
| Heart | 1566 | 0.4 | 1573 | 0 | Raised to detectable level |
| Liver | 1565 | 1.2 | 1574 | 0 | Raised to detectable level |
| Breast Tissue | 1567 | 0 | 1571 | 0 |  |
| Skin | 1568 | 1.6 | 1572 | 0 | Raised to detectable level |
| Whole Leg | 1564 | 1.0 | 1570 | 0 | Raised to detectable level |

EXAMPLE 3

A treated group of day-old chicks was started on daily doses of a total of 150 mgs. of combinations of various metal proteinates in equal proportions. The chicks were fed the metal proteinates by capsule. Another group of chicks were fed precisely as the above chick group except no metal proteinate was given. The second group of chicks served as a control. After 5 days, the chicks were sacrificed and changes in the amount of calcium in various chick tissues due to the effect of a combination of metal proteinates are reported in Table XIII as the T/C ratio.

TABLE XIII

CHANGES IN AMOUNT OF CALCIUM CHICK TISSUES DUE TO A COMBINATION OF METAL PROTEINATES ADMINISTERED IN CAPSULES REPORTED AS T/C RATIO

| Metal Proteinate Capsules | mgs each | Brain | Heart | Liver | Skin | Whole Wing | Thigh of Leg | Calf of Leg | Feet |
|---|---|---|---|---|---|---|---|---|---|
| Mg | 150 | 1.28 | 2.32 | 1.58 | 1.12 | 0.40 | 0.43 | 0.82 | 0.87 |
| Mg & Ca | 75 | 2.54 | 3.57 | 1.68 | 0.93 | 0.40 | 1.57 | 1.14 | 1.12 |
| Mg,Ca,&Fe | 50 | 2.02 | 2.50 | 2.00 | 2.50 | 0.63 | 1.23 | 0.96 | 0.92 |
| Mg,Ca,Fe, & Zn | 37 | 1.75 | 3.75 | 1.58 | 1.58 | 0.68 | 1.00 | 0.89 | 1.18 |
| Mg,Ca,Fe, Zn, & Cu | 30 | 1.89 | 2.67 | 1.78 | 3.75 | 0.90 | 1.04 | 1.00 | 1.02 |
| Mg,Ca,Fe,Zn, Cu & Mn | 25 | 1.89 | 3.57 | 2.10 | 1.18 | 0.50 | 0.36 | 1.00 | 1.02 |
| Mg,Ca,Fe,Zn, Cu,Mn & Co | 21 | 2.54 | 2.50 | 2.00 | 3.33 | 0.86 | 0.40 | 0.75 | 0.97 |

From Table XIII it is clear that daily administration of a combination of metal proteinates in capsules significantly increased the calcium levels in many chick tissues. The calcium levels were at least doubled in some chick tissues.

TABLE XIV

ELEVATION OF CALCIUM IN TREATED CHICKS AT LEAST TWO TIMES OVER CONTROL CHICKS

| Proteinate Capsule Given | Tissue Having 2X Ca increase |
|---|---|
| Mg | heart |
| Mg and Ca | heart, brain |
| Mg, Ca and Fe | heart, brain, skin, liver |
| Mg, Ca, Fe and Zn | heart |
| Mg, Ca, Fe, Zn and Cu | heart, skin |
| Mg, Ca, Fe, Zn, Cu and Mn | heart, liver |
| Mg, Ca, Fe, Zn, Cu, Mn & Co | heart, brain, skin, liver |

It is significant that the high levels of calcium in the tissues gave no indication of tissue calcification which is common when inorganic calcium preparations are given.

EXAMPLE 4

Day-old chicks were divided into groups of ten and given water and a standard chick ration ad libitum. One group of chicks was given no supplement to the standard chick ration while the remaining groups were given capsules of metal proteinates orally on the first, second and fourth days. On the fifth day, the chicks were sacrificed and the levels of metals in various tissues determined by means of an atomic absorption spectrophotometer.

Table XV illustrates the relative change in levels of metals of the treated chicks as compared to the control chicks. Where no metal was detected in either treated or control chicks the word "none" is used.

TABLE XV

EFFECT OF METAL PROTEINATES ON LEVELS OF METALS IN CHICK TISSUES AS T/C (Treated/Control) RATIO

| Metal Proteinate in mg/Kg Tissue | Brain | Heart | Liver | Rib Cage | Skin | Wings |
|---|---|---|---|---|---|---|
| Fe 1.37 | 1.00 | 4.00 | 0.37 | 1.00 | 1.00 | 1.00 |
| Mg 4.0 | 0.91 | 1.52 | 1.28 | 0.93 | 1.79 | 1.02 |
| Cu 0.79 | 1.00 | 0.38 | 8.33 | 1.00 | 2.00 | 3.00 |
| Mn 0.70 | none | 1.00 | 1.00 | treated = 0.2mg% | 1.00 | 0.50 |
| Co 0.59 | none | none | none | none | treated = 0.04 mg% | none |

TABLE XV—Continued

EFFECT OF METAL PROTEINATES ON LEVELS OF METALS IN CHICK TISSUES AS T/C (Treated/Control) RATIO

| Metal Proteinate in mg/Kg Tissue | Brain | Heart | Liver | Rib Cage | Skin | Wings |
| --- | --- | --- | --- | --- | --- | --- |
| Zn 1.05 | 1.13 | 0.82 | 1.26 | 1.96 | 1.06 | 1.42 |
| Ca 2.03 | 2.00 | 1.53 | 1.09 | 2.26 | 0.83 | 1.01 |

| Metal Proteinate in mg/Kg Tissue | Thigh of Leg | Calf of Leg | Feet | Gizzard | Intestine |
| --- | --- | --- | --- | --- | --- |
| Fe 1.37 | 2.00 | 1.00 | 1.00 | 3.00 | 3.00 |
| Mg 4.0 | 0.97 | 1.04 | 1.06 | 1.52 | 8.38 |
| Cu 0.79 | 1.00 | 1.00 | 1.00 | 5.33 | 43.0 |
| Mn 0.70 | 1.00 | 1.00 | treated=0.4 mg% | 2.00 | 0.87 |
| Co 0.59 | none | none | none | none | treated =0.08 mg% |
| Zn 1.05 | 1.52 | 1.77 | 2.54 | 2.85 | 3.23 |
| Ca 2.03 | 3.58 | 1.39 | 1.29 | 1.12 | 2.35 |

EXAMPLE 5

The following formulation of metal proteinates was prepared:

TABLE XVI

| Metal Proteinate | Amount in Grams |
| --- | --- |
| Co | 1 gm. |
| Cu | 2 |
| Mn | 5 |
| Fe | 10 |
| Zn | 20 |
| Ca | 200 |
| Mg | 200 |
| Total | 438 gms. |

The metal proteinates were weighed and blended with mortar and pestle in the order set forth in Table XVI. To 100 gms. of the metal proteinate blend were added 130 gms. of lactose U.S.P. powder. The blend had the following metal composition based on 10 percent metal in each metal proteinate:

TABLE XVII

| Metal | Amount in mg. % |
| --- | --- |
| Co | 12.9 mg. % |
| Cu | 25.8 |
| Mn | 64.5 |
| Fe | 129.0 |
| Zn | 258.0 |
| Ca | 2580.0 |
| Mg | 2580.0 |
| Total | 5650.2 mg. % |

Concentration multiples of 1 X, 0.1 X and 0.01 X were prepared by diluting the blended material in lactose, using 10 gms. of the metal proteinate blend and 90 gms. of lactose for each dilution. The respective diluted blends were placed in No. 5 gelatin capsules weighing 3 mgs. each. The average weight of each capsule containing the 1 X concentration was 178 mgs. The dosage of metals obtained in this capsule is set forth in Table XVIII.

TABLE XVIII

| Metal | Metal Dosage/capsule (1 X) |
| --- | --- |
| Co | 0.02962 mg. |
| Cu | 0.04592 |
| Mn | 0.11481 |
| Fe | 0.22962 |
| Zn | 0.4924 |
| Ca | 4.5924 |
| Mg | 4.5924 |

Fifty one-day-old bronze turkey poult hens were divided into groups of ten birds each. The groups of turkey poults were treated as follows:

Group 1: The birds were fed turkey pre-starter ration and water ad libitum. No metal proteinate was given and this group, therefore, served as control birds.

Group 2: The birds were given a 1 X capsule, daily by mouth. The capsule was dipped in water to moisten and dropped into the crop by forceps.

Group 3: The birds were given a 0.1 X concentration capsule daily in the same manner as Group 2.

Group 4: The birds were given a 0.01 X concentration capsule daily in the same manner as in Group 2.

Group 5: The poults were fed turkey pre-starter containing a 0.01 X level of metal proteinate blend, prepared by mixing 10 gms. of 1 X metal proteinate blend with 990 gms. of pre-starter ration.

The treated turkey poults of groups 2–5 were weighed daily and compared with the control birds of group 1. Table XIX illustrates the changes in weight of the birds in the various groups.

TABLE XIX

| | 1st Day | 2nd Day | 3rd Day | 4th Day | 5th Day |
|---|---|---|---|---|---|
| | | | Average Weights of Birds | | |
| Group 1 (Control) | 48.7 gm | 51.4 gm | 60.0 gm | 64.3 gm | 74.6 gm |
| (No. of Birds) | (10) | (10) | (10) | (10) | (9)* |
| Group 2 (1 X Cap) | 50.7 gm | 50.5 gm | 65.8 gm | 73.4 gm | 80.9 gm |
| (No. of Birds) | (10) | (10) | (10) | (10) | (10) |
| Group 3 (0.1 X Cap) | 50.6 gm | 53.4 gm | 64.2 gm | 65.3 gm | 77.9 gm |
| (No. of Birds) | (10) | (10) | (9)* | (9) | (9) |
| Group 4 (0.01 X Cap) | 50.2 gm | 50.4 gm | 65.6 gm | 75.5 gm | 85.0 gm |
| (No. of Birds) | (10) | (10) | (9)* | (8)* | (8) |
| Group 5 (0.01 X in feed) | 51.8 gm | 53.0 gm | 66.6 gm | 68.6 gm | 84.6 gm |
| (No. of Birds) | (10) | (9)* | (9) | (9) | (8)* |

* Death of poults diagnosed as para-colon.

Analysis of results from the standpoint of daily growth increases indicated a stimulating effect on the growth by all of the levels of metal proteinate blend when compared to the control birds. Table XX shows the average cumulative weight increase of the turkey poults for the indicated dosage levels at the second, third, fourth and fifth days, respectively.

TABLE XX

AVERAGE DAILY WEIGHT INCREASES OF TURKEY POULTS

| | 2nd Day | 3rd Day | 4th Day | 5th Day | Total Percent Increase |
|---|---|---|---|---|---|
| Control | 2.7 gm | 11.3 gm | 15.6 gm | 25.9 gm | 34.7% |
| 1 X Capsule | 0.0 gm | 15.1 gm | 22.7 gm | 30.2 gm | 37.3% |
| 0.1 X Cap | 2.8 gm | 13.6 gm | 14.7 gm | 27.3 gm | 35.1% |
| 0.01 X Cap | 0.2 gm | 15.4 gm | 25.3 gm | 35.0 gm | 41.7% |
| 0.01 X Feed | 1.2 gm | 14.8 gm | 16.8 gm | 32.8 gm | 38.8% |

Death losses diagnosed as due to para-colon appeared in the controls and at lower dosage levels of metal proteinate. The individual birds which perished showed the usual symptoms of para-colon, including weight loss and feebleness prior to death. Autopsies showed a jaundiced liver, a bloody intestine and enlarged spleen. The excellent condition of all the birds receiving the 1 X capsule suggested a possible beneficial effect of the metal proteinate in increasing resistance to para-colon.

Recent studies of the levels of bivalent metals in solution in different biological cells have indicated that metal concentration gradients in the cells correlate with the electromotive properties of the cells. Ordinarily, each cell is self-regulatory in that the excess of bivalent metal in each cell is spontaneously converted to an inert, insoluble form. However, deficiencies of metal within the cell restricts the electromotive capacity of the cell. Thus, examination of the metal content of skin, feathers, and other animal tissues from various locations may serve as an indicator as to the electromotive capacity and the metal content of the respective cells.

Recent findings suggest that poorly defined metal concentration gradients and irregularities in gradients in animal tissues indicate conditions relating to biological stress, whereas sharply defined, smooth metal concentration gradients represent healthy electromotive capability within the cells.

The present invention provides an improved method for diagnosing a metal deficiency in the tissue by analyzing skin, feathers, hair and other tissue from selected animals and comparing the metal content and distribution found therein with values obtained on tissue specimens derived from healthy and productive animals. Assay results from the healthy, productive animals may then be used as a basis for formulating an effective metal proteinate food supplement composition for treatment of one or more selected animals.

EXAMPLE 6

Ten thousand laying hens were chosen and separated into two groups of 5000 each. One group received 2 pounds of metal proteinate blend per ton of normal feed composition, the metal proteinate being formulated on the basis of assay of normal feathers from young, well-fed, laying hens. In a sixty-day period, the hens treated with metal proteinate of the mentioned formulation layed 18,210 more eggs than hens not treated with metal proteinate. The hens were then forced to molt. Just prior to molt, assays of the feathers for metal content showed that the group fed metal proteinates averaged significantly higher levels than controls. Moreover, a very favorable effect on the quality of the eggs was found to result. Eggs from hens fed with metal proteinates required an average of 1.7 pounds more pressure to break the egg shell than eggs from the control hens. The lining of the eggs showed greater tensile strength. Greater iron and zinc deposition was found in the egg yolk from the treated birds as compared to the controls. On the average, there was 11.14 percent more zinc, 10.59 percent more iron and 6.0 percent more copper in eggs laid by the treated birds when compared to eggs laid by the control birds.

The high increase in the number of eggs produced by the treated group of hens resulted not only from a higher lay rate but also from increased capacity to lay over a longer time span. Table XXI sets forth the results measured as the percentage of hens laying an average of one egg per day (lay rate) at the peak lay period for the group and 6 months after the peak. Hens in both groups started laying at 20 weeks of age.

TABLE XXI

|  | Control Group | Treated Group |
|---|---|---|
| Peak Lay Rate | 75% | 85% |
| 6 Months after Peak | 64% | 80% |

EXAMPLE 7

Twenty-five hundred laying hens, which had been in peak lay 3 months, were selected. Twenty-five randomly-selected chicks reproduced by the laying hens were chosen as controls and the hemoglobin level in gm. percent of each chick was recorded. The average hemoglobin content of the control chicks was 8.7 gm. percent. The hens were then placed on metal proteinate. Forty-three days later, eggs from the treated hens were set and 25 chicks from those eggs were selected at random and assayed for hemoglobin. The average hemoglobin of the second group of chicks was 9.4 gms. percent as compared to 8.7 gms. percent of the control chicks. Significantly, the death loss between the control chicks and the treated chicks decreased in the first 7 days of life from 2.0 to 0.8 percent.

EXAMPLE 8

Five hundred laying hens diagnosed as having avian leucosis were given metal proteinates along with normal feed ingredients. In the formulation of metal proteinates, magnesium and zinc were the predominant ingredients. The yellow appearance of the combs and waddles which normally attend this disease disappeared and the comb and waddle returned to the normal red color within thirty days. The birds took on a healthy appearance and death loss dropped to a negligible amount. Moreover, egg production jumped back up to the normal range within this 30-day period. The quality of the egg shell, surprisingly, became normal within 30 days and the egg breakage in the nests was decreased 97 percent.

EXAMPLE 9

Five races of fingerling cut throat trout, each race having approximately 50,000 fish, were given a feed ration with an addition of one-half per cent per ton of a metal proteinate formulation. The five races of fish were compared with a race of control fish given the same feed without the metal proteinate addition. Samples of the fish in each race were weighed every two weeks for approximately one year. It was discovered that the feed conversion, i.e., the amount of food required to produce one pound of meat, was much higher in the fish fed with rations having the metal proteinate addition. The treated fish consumed an average of 1.2 pounds of feed per pound of weight gained by the treated fish while the untreated or control trout consumed an average of 4.2 pounds of feed per pound of weight gained by the control fish.

EXAMPLE 10

Since all biological tissues have a similar fundamental need for essential metals, the present invention has important application to plants as well as animals. To determine the effect of metal proteinate on plants compared to inorganic metals, two soil additives were prepared, one principally comprising a blend of metal proteinates and the other a blend of inorganic minerals having an essentially identical metal composition. The preparations are set forth in Table XXII below.

TABLE XXII

| Metal Proteinate Preparation* | | Inorganic Mineral Preparation | |
|---|---|---|---|
| Mg | 10.00% | Mg | 10.00% |
| Fe | 0.80 | Fe | 0.80 |
| Zn | 0.80 | Zn | 0.80 |
| Cu | 0.06 | Cu | 0.06 |
| Mn | 0.04 | Mn | 0.04 |
| Co | 0.02 | Co | 0.02 |
| | | I (as KI) | 0.36 |

*0.36% KI was added to the proteinate blend.

The effect of each preparation on garden variety sweet corn over a range of approximately four months was determined by the following procedure. Furrows were made in the ground 2 inches deep for the full length of the test plot. Corn seeds were placed in the furrows 2 inches apart and the furrows were measured off in sections of 10 feet each and numbered. To the first section was added 2 ounces of inorganic material of the above formula which was evenly distributed around the seeds in the first section. Two ounces of the metal proteinate preparation was essentially uniformly distributed around the seeds in section two. The next sections were serially treated as section one and two, respectively, so that the use of metal proteinate and inorganic mineral preparations were alternated every 10 feet through the full length of the furrows in the test plot.

At the end of the four-month period, the height of the corn stalks in the test plots were compared. The height of the corn in the test plots containing metal proteinates averaged about seven feet. The height of the corn in the test plots containing inorganic minerals averaged 5 to 5½ feet.

EXAMPLE 11

Garden variety cantaloupe were planted with special uniformity along furrows prepared as in Example 10. Alternate 10-foot sections were respectively provided with additions of the metal proteinate preparation set forth in Table XXII and the inorganic mineral preparation as in the same Table, according to the procedure of Example 10. One-half ounce of metal proteinate was placed around the roots of each cantaloupe plant and each was individually identified. One-half ounce of inorganic minerals was placed around the roots of cantaloupes in the alternating sections and those plants were identified.

After about 4 months, the cantaloupes growing from soil treated with metal proteinates ranged in weight between 5½ pounds and 7½ pounds. Cantaloupes growing from the soil to which the inorganic minerals was added ranged in weight between 2½ pounds and 3 pounds.

If desired, the metal proteinate may be pre-mixed with conventional soil conditioner, which may comprise fertilizer, and the resulting mixture placed with the soil. Pre-mixing may accommodate uniform distribution of the metal proteinate in the soil conditioner when desired, which will provide for even distribution of the metal proteinate and the soil conditioner upon the soil.

From the foregoing, it is clear that surprisingly beneficial effects result from making essential metals available to plants and animals in a biologically acceptable form. By not requiring plants and animals to synthesize their own metal proteinates from inorganic metals, individual differences in biological capability of plants and animals are no longer responsible for an inadequate nutritional level. Moreover, by determining the metal gradient in the tissue of healthy plants and/or animals and comparing that gradient with the metal gradient in selected plants and/or animals of particular interest, an effective standard of evaluating the selected plants and/or animals is established. Thereafter, the selected plants and/or animals may be provided with a metal proteinate formulation based, if desired, on the metal gradient in the healthy plants and/or animals to correct any latent deficiencies.

EXAMPLE 12

Although the metal proteinate used in the above examples may be made according to any one of a number of processes using a variety of organic and inorganic compounds, the following is one suitable way of preparing a general purpose metal proteinate:

mix well:
| | |
|---|---|
| STARCH | 40 lbs. |
| fish meal | 40 lbs. |
| water | 4 lbs. |
| ammonia water | 1 lb. | then add:
| | |
|---|---|
| hydrochloric acid | 1000 cc. |
| phosphoric acid | 6000 cc. |

Hydrolyze the above mixture at 212°F and 15 pounds pressure for 1 hour. Agitate the mixture constantly during hydrolysis. After hydrolysis is complete, reduce the pressure to ambient and add the following:

| | | |
|---|---|---|
| magnesium sulfate | 3.05 lbs. | |
| zinc sulfate | 0.23 lbs. | |
| copper sulfate | | 17.60 gms. |
| potassium iodide | | 14.10 gms. |
| potassium chloride | 3.05 lbs. | |
| sulfur | | 130.00 gms. |
| calcined magnesia | 4.00 lbs. | |
| ammonia water | q.s. to bring pH to 7 | |

The mixture is then dried at room temperature. Effective, non-toxic dosages for the compositions disclosed herein include 400 pounds per acre when used as an all purpose plant fertilizer and one teaspoon to one-fourth ounce when used as an individual plant fertilizer, depending on plant size. Swine, cattle, poultry, horses and small animals — 3 to 5 pounds per each ton of complete feed.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are therefore to be embraced therein.

What is claimed and desired to be secured by United States Letters Patent is:

1. In a method of stimulating plant growth by preparing a plant-life sustaining medium and bathing a plant or seed in the medium, the improvement comprising adding at least one metal proteinate presenting a solubility of less than about 7.6 milligrams percent in a solution of pH 8 to the plant by associating the metal proteinate, in an amount adequate to stimulate plant growth, with the medium from which the plant otherwise sustains life, the metal proteinate comprising a metal selected from the group consisting of calcium, magnesium, zinc, iron, maganese, copper and cobalt.

2. In a method according to claim 1 wherein the preparing step comprises providing a soil medium.

3. In a method according to claim 2 wherein the preparing step further comprises premixing the metal proteinate with conventional soil conditioner and thereafter distributing the mixture over the soil.

4. In a method as defined in claim 1 wherein the preparing step comprises providing a hydroponic medium.

* * * * *